Dec. 11, 1951      E. H. CUMPSTON, JR      2,578,464
MECHANISM FOR FEEDING ROTARY TOOL SPINDLES
OF DRILL PRESSES AND THE LIKE
Filed Oct. 16, 1947      5 Sheets-Sheet 1
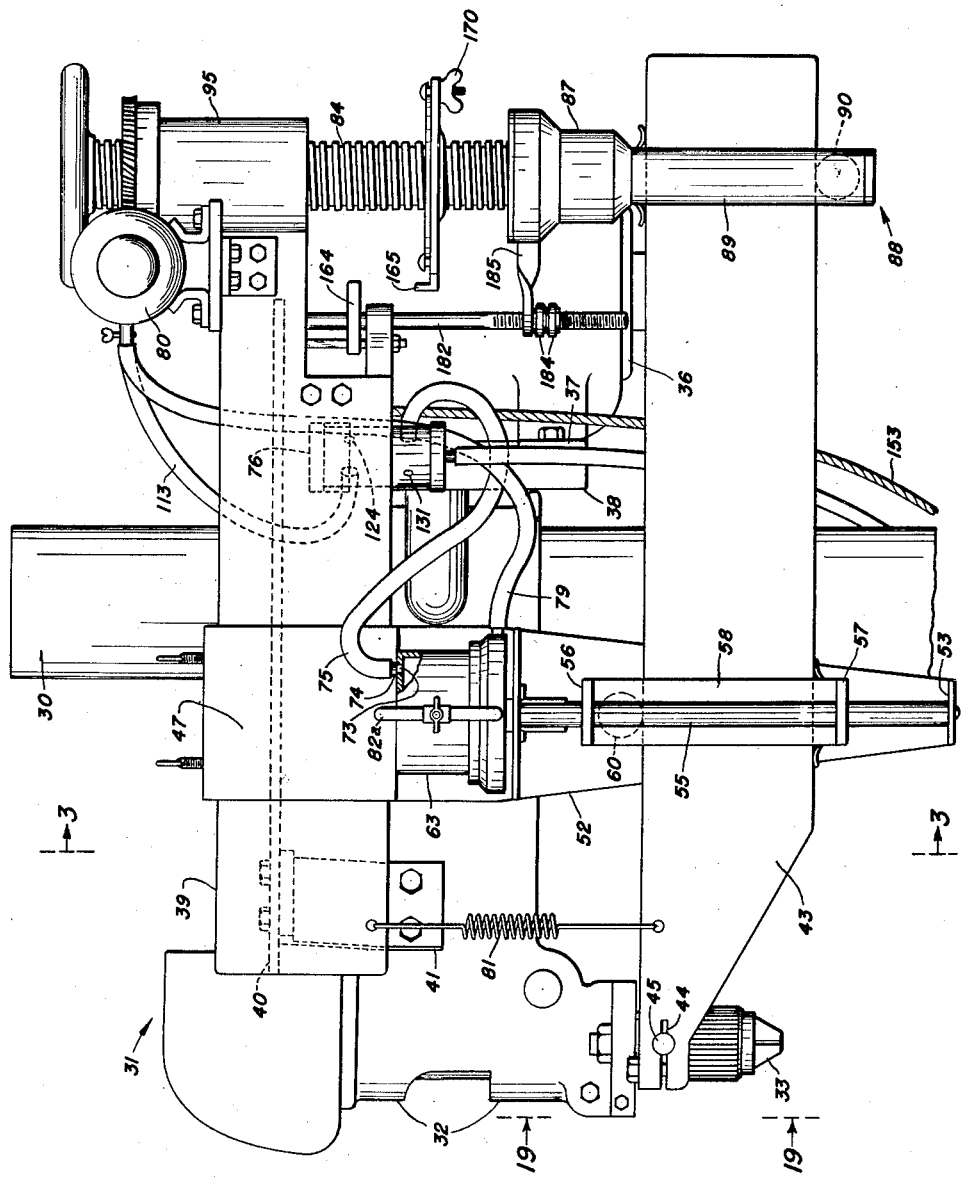
INVENTOR.
EDWARD H. CUMPSTON, JR.
BY
ATTORNEY

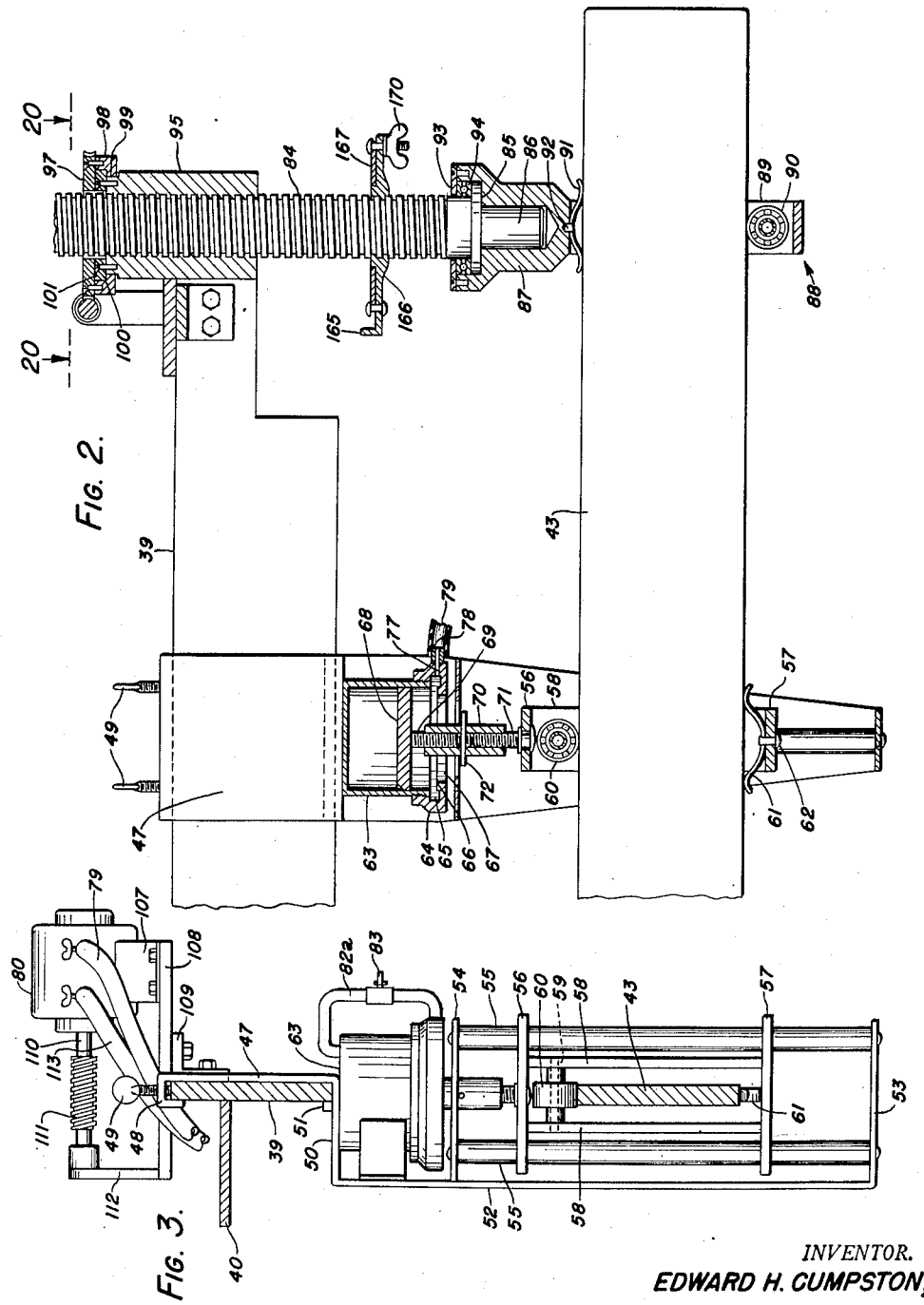

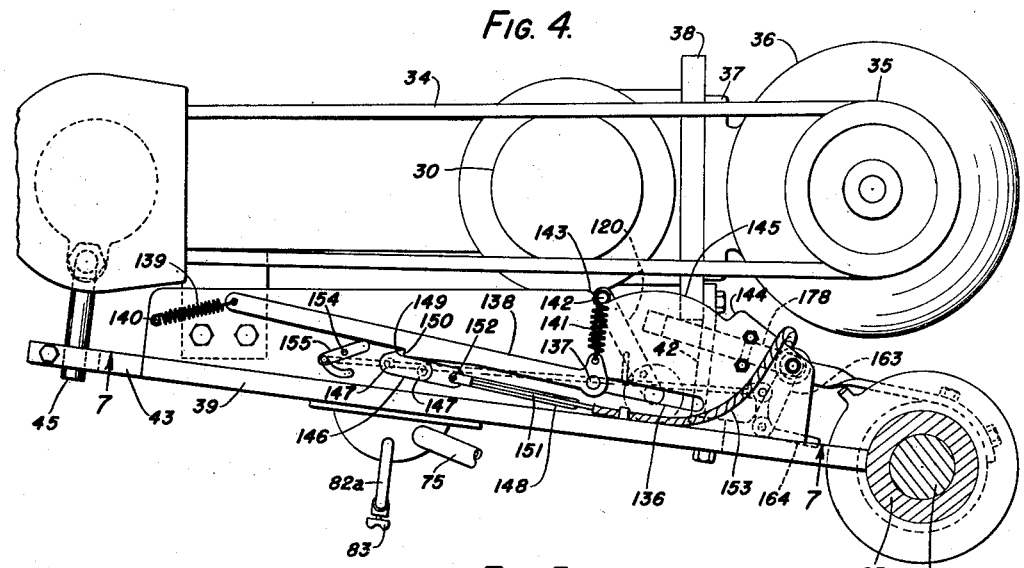
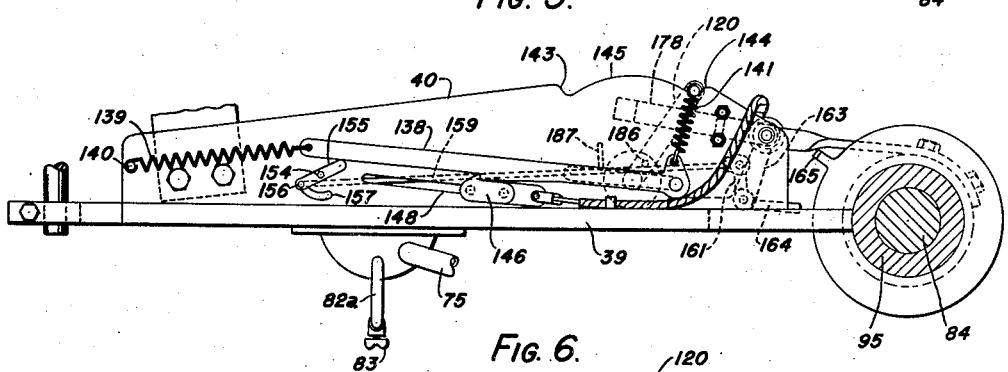
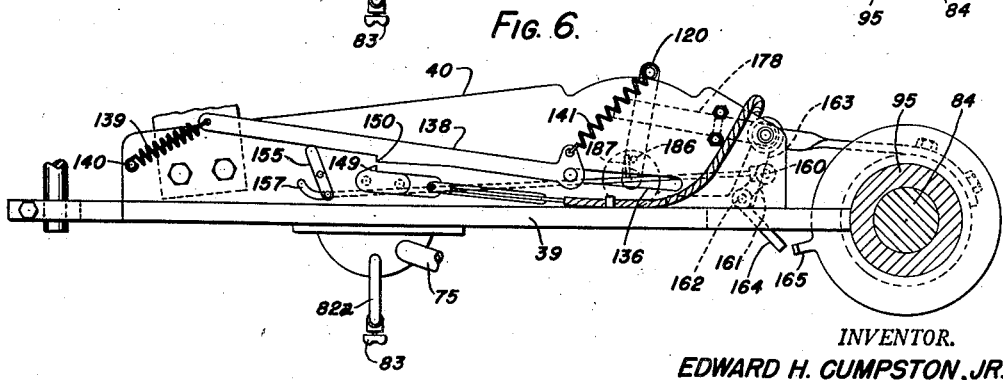

Dec. 11, 1951 E. H. CUMPSTON, JR 2,578,464
MECHANISM FOR FEEDING ROTARY TOOL SPINDLES
OF DRILL PRESSES AND THE LIKE
Filed Oct. 16, 1947 5 Sheets-Sheet 4
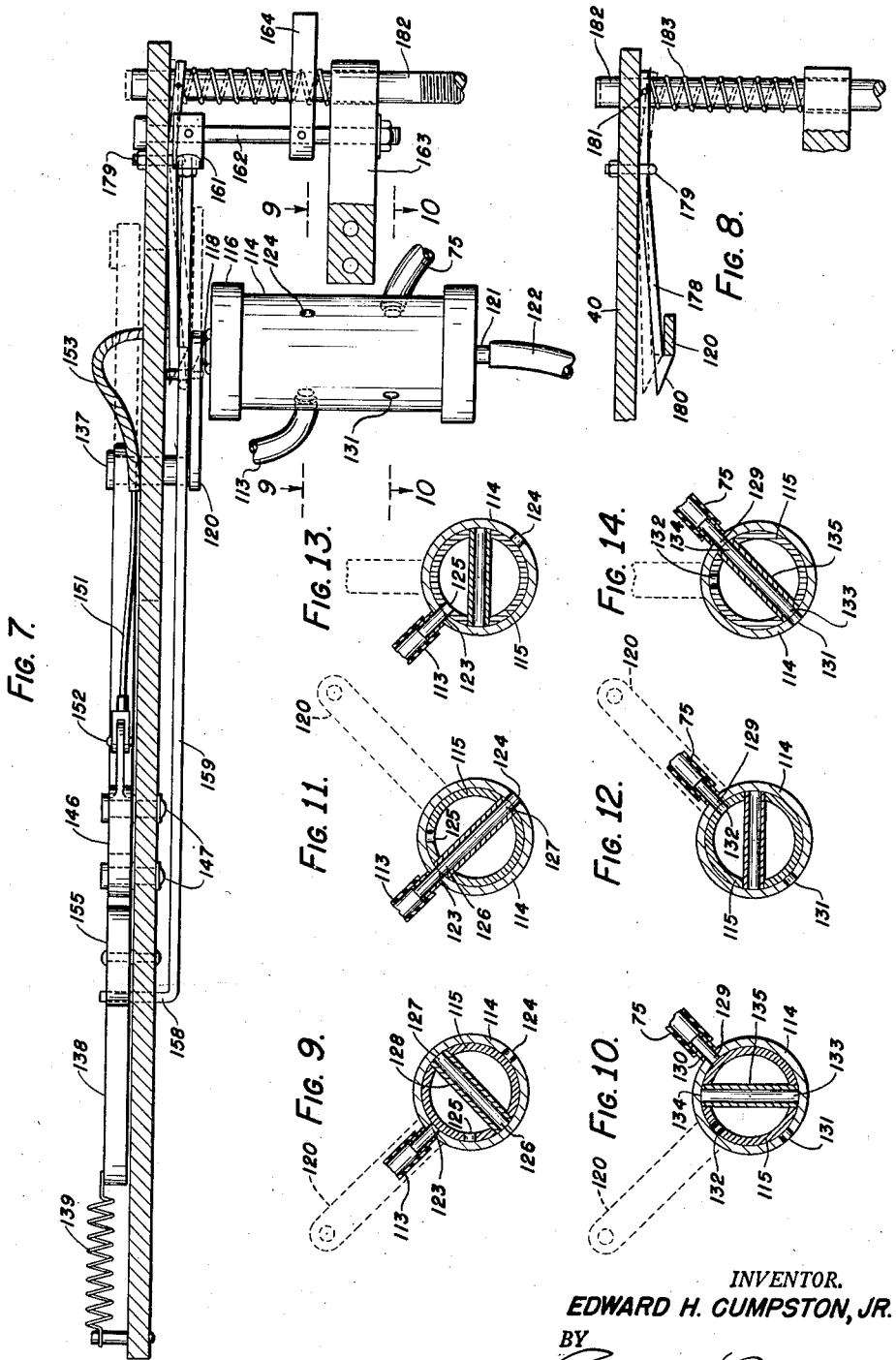
INVENTOR.
EDWARD H. CUMPSTON, JR.
BY
ATTORNEY

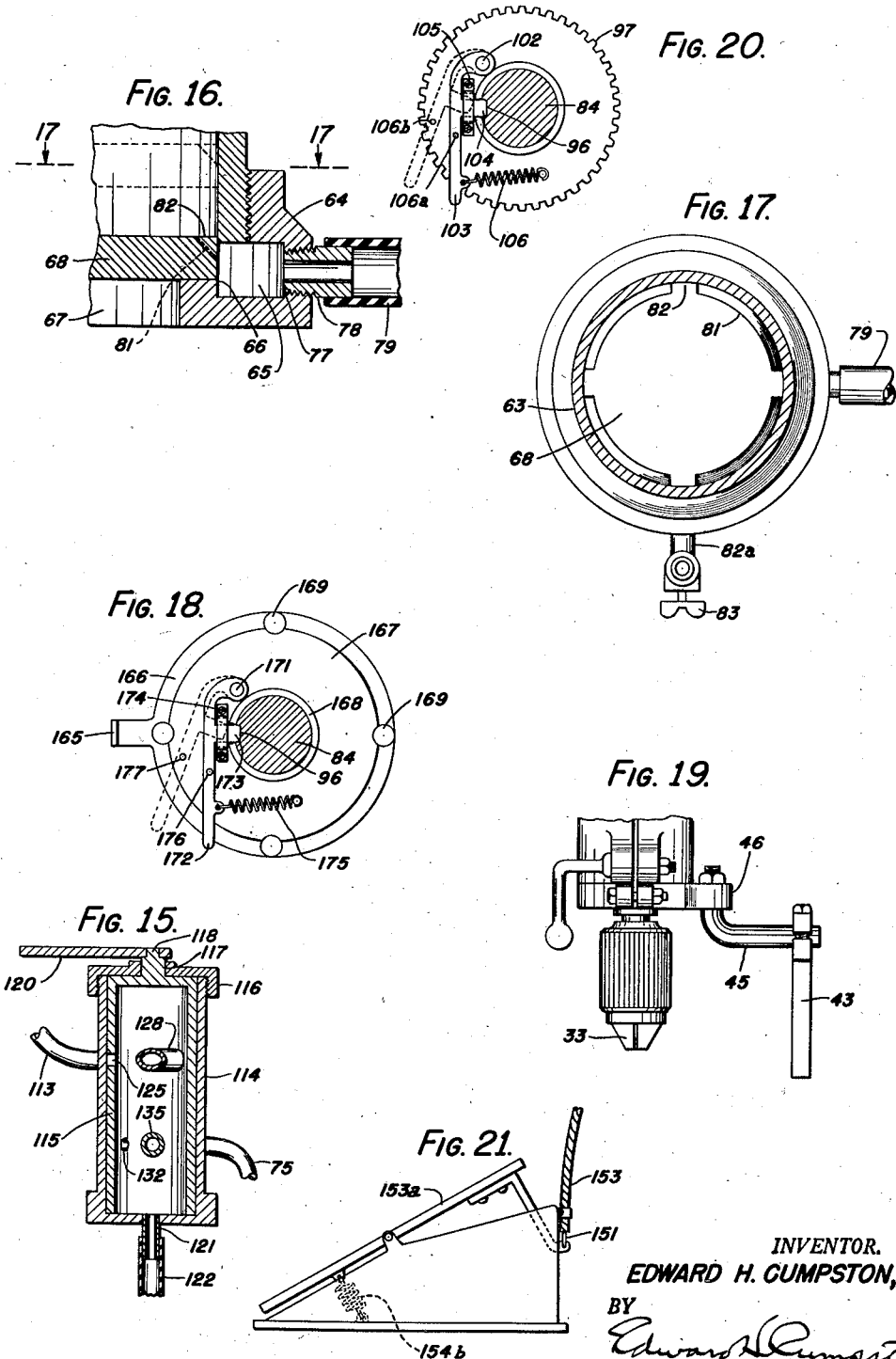

Patented Dec. 11, 1951

2,578,464

UNITED STATES PATENT OFFICE 2,578,464

MECHANISM FOR FEEDING ROTARY TOOL SPINDLES OF DRILL PRESSES AND THE LIKE

Edward H. Cumpston, Jr., Rochester, N. Y.

Application October 16, 1947, Serial No. 780,220

12 Claims. (Cl. 77—5)

The invention relates to mechanisms for feeding rotary tool spindles, such as the rotary spindle of a drill press or the like, one object of the invention being to provide an improved spindle feeding mechanism having a more simple and efficient type of construction.

Another object is the provision of a mechanism of the above character operated by motor means and so constructed as to eliminate any vibration or oscillation in the feeding movement of the tool spindle.

Another object of the invention is to provide a mechanism of the character described capable of effecting rapid approach and backing-off movements of the spindle, in addition to the cutting feed thereof, with means for completely controlling all of said feeding movements by simple movements of a single actuating means, such as a foot pedal.

Another object is to supply a mechanism of the above character in which the cutting feed of the spindle may be relieved at any time by a rapid backing-off movement followed by a rapid approach movement to a point just short of the position at which the spindle was relieved, so as to resume the cutting feed gradually and without impact.

Another object is the provision of such a mechanism in which the approach movements of the tool spindle are effected by an adjustable force adapted to yield and allow the tool to stop in case of inadvertent contact with any interfering object, so as to avoid injury to any of the parts.

Another object is to produce a feeding mechanism of the above character comprising automatic means for disconnecting the actuating means of the feeding mechanism when the tool reaches a predetermined depth and for reversing and subsequently discontinuing the feeding movement subject to reconnection with the actuating means.

Another object is the provision of such a mechanism the motive power for which is supplied solely by pneumatic motor means, thus requiring no electrical wiring.

Another object is to afford a mechanism of the above described nature having means for readily varying the speed and amplitude of the cutting feeds to suit varying working conditions.

A further object is to supply a mechanism of this character having a compact construction and arrangement capable of being easily mounted, for example, on a common type of drill press and of being located between the adjacent heads of a multi-spindle press.

Still a further object is to provide a mechanism having the above advantages and adapted to be set up for any given operation in a simple and rapid manner.

To these and other ends the invention resides in certain improvements and combinations of parts, all as will be hereinafter more fully described, the novel features being pointed out in the claims at the end of the specification.

In the drawings:

Fig. 1 is a side elevation of a drill press head equipped with a feeding mechanism embodying the present invention, the parts being shown in an intermediate position;

Fig. 2 is a similar view of some of the parts appearing in Fig. 1, partly in section for further illustration;

Fig. 3 is a sectional elevation on the line 3—3 in Fig. 1;

Fig. 4 is a top plan view, partly in section, showing the mechanism for controlling the motor feeding means, with the parts in initial inactive position corresponding to a retracted position of the tool spindle;

Fig. 5 is a view similar to Fig. 4, but with the parts shown in position for advancing the tool spindle;

Fig. 6 is a view similar to Fig. 4, but with the parts in position for reversing the feeding movement to retract the tool spindle;

Fig. 7 is an enlarged sectional elevation on the line 7—7 in Fig. 4, to further illustrate certain parts of the control mechanism including the air valve means;

Fig. 8 is a similar view of some of the parts shown in Fig. 7 but in a different operating position;

Figs. 9 and 10 are sectional views on the lines 9—9 and 10—10, respectively, in Fig. 7, showing the valve in initial or inactive position;

Figs. 11 and 12 are similar views on the same lines as Figs. 9 and 10, respectively, but showing the valve in position to start feeding movement of the tool spindle;

Figs. 13 and 14 are similar views on the same lines as Figs. 9 and 10, respectively, but showing the air valve in position for reversing and retracting the tool spindle;

Fig. 15 is an enlarged vertical sectional elevation of the air valve;

Fig. 16 is an enlarged sectional elevation of a portion of the pneumatic cylinder and piston shown in Fig. 2, but with the piston in its lowermost position;

Fig. 17 is a reduced sectional view on the line 17—17 in Fig. 16;

Fig. 18 is a top plan view partly in section of an adjustable depth stop means for limiting the depth of cutting feed of the tool spindle;

Fig. 19 is a fragmentary elevation on the line 19—19 in Fig. 1, showing the connection of the feeding mechanism with the tool spindle;

Fig. 20 is a top plan view, partly in section, on the line 20—20 in Fig. 2, and

Fig. 21 is a side elevation of treadle actuating means.

The preferred embodiment of the invention, herein disclosed by way of illustration, is an embodiment particularly adapted for application to the tool spindle head portion of a drill press and comprises spaced bars, the upper of which is adapted to be bolted, welded, or otherwise attached to the tool head, to serve as a support for the feeding mechanism. The lower bar or lever is pivotally suspended intermediate its end from the upper bar and has one end pivotally connected with the tool spindle. The lower bar is moved to cause the feeding movements of the tool spindle by pneumatic motor devices mounted on the upper bar and controlled by air valve means to effect the cutting feed movements, as well as rapid approach and backing-off movements of the tool spindle. The air valve means also mounted on the upper bar is operated by the simple movement of a push-pull wire connected to any known and suitable actuating means such as a spring actuated treadle.

Referring more particularly to the drawings, there is shown at 30 (Fig. 1) a vertical column of a drill press mounted on a suitable pedestal (not shown) and supporting a tool spindle head indicated generally at 31, above a suitable work table (not shown), as well understood in the art. Head 31 includes guideways 32 at its forward end for the vertically slidable sleeve or quill which rotatably supports the vertical tool spindle carrying at its lower end a chuck 33 for the drill bit or other tool, the quill and spindle being movable vertically as a unit in the quill guideways to feed the tool toward and from the work. The tool spindle, in the present instance, has fixed thereon a pulley (not shown) which is rotated by a belt 34 (Fig. 4), running on a pulley 35 on the upper end of the vertical shaft of an electric motor 36 having a base 37 bolted to a motor supporting plate 38 carried by the head of the machine, these being all parts of a common and typical drill press construction.

The feeding mechanism comprises an upper supporting bar 39 (Figs. 1, 2 and 3), lying in a vertical plane substantially parallel with the head 31 of the machine and having welded or otherwise fixed to its inner side a horizontal shelf plate 40 for supporting the mechanism for controlling the feeding movements, as hereafter described. Upper bar 39 is supported on the machine head by means comprising mainly an angular bracket 41 bolted to the forward end of its plate 40 and to the machine head, the rear end of bar 39 being supported, if desired, by a bracket 42 (Fig. 4), bolted thereto and to the motor supporting plate 38 of the head, as shown, such means for attaching the mechanism to the drill press being subject to some obvious variation to suit the particular design of the press to which the attachment is made. The center portion of bar 39 is thus supported free and clear of the machine head and carries a longitudinally slidable mounting on which a lower bar or lever 43 is pivotally movable to raise and lower the tool spindle quill. Bar 39 also carries motor devices for effecting such feeding movements of lever 43 and means for controlling such motor devices, as hereafter more fully described.

Lever 43 is preferably mounted in spaced relation below and substantially in the plane of supporting bar 39, being pivotally supported intermediate its ends on a mounting which is adjustable longitudinally of the bars 39 and 43 and which may be raised and lowered by motor means, to effect the rapid approach and back-off movements of the spindle, as hereafter described. The forward end of lever 43 has a bearing opening 44 pivotally receiving the outer end of a trunnion rod 45 (Fig. 19), having its inner end fixed to a bracket 46 on the tool spindle quill, such as usually provided on such quills for the connection therewith of a depth stop device. Supporting bar 39 and lever 43 are preferably positioned with the forward end of lever 43 in close proximity to the tool spindle, so that trunnion rod 45 may be kept short to minimize the application to the spindle of any lateral or torque force. The other or rear end of lever 43 in connected with means hereafter described for effecting the pivotal movements of the lever which produce the cutting feed of the tool quill and spindle.

The means for pivotally mounting the lever member 43 comprises, preferably, an angular plate hanger 47 (Figs. 1, 2 and 3), having an upper edge 48 bent into channel shape and engaging over and slidably embracing the upper edge of supporting bar 39, this channel edge carrying clamping screws 49 for clamping the hanger in longitudinally adjusted position on bar 39. The hanger depends below the lower edge of bar 39 and has a portion 50 turned horizontally inwardly under the bar and carrying guide lugs 51 for engagement with the inner side of the bar. Portion 50 terminates in a depending portion 52 having its lower end turned forwardly, as at 53, under and below lever 43. Portion 52 has welded, or otherwise fixed thereto, a horizontal bracket 54 spaced above the lever 43, as shown. Fixed at their upper and lower ends in the bracket plates 53 and 54 are a pair of transversely spaced vertical guide rods 55. Slidable vertically on these rods is a frame comprising horizontal bars 56 and 57 spaced one above and the other below the lever 43, and these bars are rigidly connected with each other by a pair of vertical struts 58 spaced from each other on opposite sides of lever 43. These struts support the opposite ends of a spindle 59 located above the lever 43 and carrying a roller bearing element 60, the outer rotating cylinder of which bears against the upper edge of lever 43. Bar 57 carries an elliptical leaf spring 61, which bears against the lower edge of lever 43 and holds its upper edge in contact with the roller bearing 60, spring 61 being preferably impaled on a pin 62 in the bar to hold it against displacement thereon. It is evident that lever 43 is thus pivotally supported between the roller bearing 60 and take-up spring 61 on the above described frame, which is mounted to slide vertically on the rods 55 of the hanger. The means for variably supporting this frame will now be described.

The means for raising and lowering the point of pivotal support of lever 43 comprises, preferably, a pneumatic motor device, of the cylinder and piston type, having a cylinder 63 with a closed upper end, which is welded or otherwise fixed to the horizontal step 50 of bracket 47 (Figs. 2 and 3). The open lower end of the cylinder has externally threaded thereon a ring 64, the lower end of which is turned inwardly below the end of the cylinder, as shown, thus forming below it an annular passage or channel 65 having an outer diameter somewhat greater than the inner diameter of the cylinder. This lower portion of the ring extends inwardly under the cylinder chamber and terminates in an upwardly turned portion 66 adapted to form an annular valve seat about a circular bottom opening 67 in the ring communicating with the atmosphere. Reciprocating in the cylinder is a loosely fitting piston plate 68 fixed on the upper end of a short threaded piston rod 69, threadedly connected with a turn-buckle sleeve 70, the lower end of which is threadedly connected with a short rod 71 having its lower end anchored in an opening in plate 56 of the adjustable pivot frame. Sleeve 70 is provided with a transversely extending handle rod 72 by which it may be rotated, while the piston is held by air pressure stationary on its seat 66, to vary the spaced relation between the piston and the frame.

Cylinder 63 is provided with an inlet port for air pressure for moving piston 68 downwardly, comprising a port opening in its upper end having a connected nipple 74 to which is attached one end of a flexible hose 75 connected at its other end with valve means 76, hereafter described, for operating the motor devices. The annular channel 65 in the ring 64 of the cylinder is formed with a port opening 77 (Figs. 2 and 16) provided with a nipple 78 with which is connected a flexible hose 79 having its other end connected with one of the ports of a pneumatic rotary motor means 80, hereafter described, for effecting the cutting feed of the tool spindle. This port 77 is hereinafter referred to as the motor port of the cylinder, while the opening 67 of ring 64 is referred to as its atmospheric port.

It is evident from this construction that the supply of air pressure to the upper end of the cylinder through port 73 will force piston 68 downwardly until its under surface finally seats against the annular seating surface 66 of ring 64, thus closing the atmospheric port 67. The periphery of the upper surface of the piston is formed with a substantially continuous bevelled surface 81 adapted to clear the lower end of the cylinder in the lowermost position of the piston, so as to establish communication between the upper end of the cylinder and the annular channel 65, the piston periphery being left with intermittent unbeveled edge portions 82 to maintain guiding contact with the cylinder wall. This lower position of the piston, therefore, establishes communication between the upper end of the cylinder and the motor port 77 for transmitting air pressure for operating the motor 80, the atmospheric port 67 being closed. The raising of the piston above seat 66, however, cuts off this supply of pressure to motor port 77 and connects it instead with the atmospheric port 67 to vent the motor 80 during operation in a reverse direction.

Piston 68, in its downward movement in the cylinder, thus first lowers the pivot of lever 43 to effect rapid approach movement of the tool spindle, during which downward movement port 77 remains vented to the atmosphere. In its lowermost position, following such approach of the tool, the piston serves as a valve to close the atmospheric port 67 and supply air pressure to port 77 for energizing motor 80 to effect cutting feed of the tool. On relief of the air pressure above the piston, it is raised by upward movement of lever 43 which rises with the tool spindle under actuation by the spring means commonly provided for counterbalancing and raising such tool spindles. If necessary, this spring force may be supplemented by an auxiliary coiled tension spring 81 (Fig. 1) connected between the lever and the upper bar 39.

Means are provided for adjustably varying the air pressure employed in lowering piston 68 and lever 43, to cause the approach movement of the tool, comprising a by-pass pipe 82a (Figs. 1 and 3), connecting the upper end of cylinder 63 with the passage 65 at its lower end and the atmospheric port 67. This pipe is controlled by a throttle valve 83 for regulating the amount of pressure on the upper side of the piston and thereby regulating the speed and force of its downward movement. By means of this regulated by-pass, also, the actuating pressure above the piston is relieved in case the approach movement of the tool is obstructed by inadvertent contact with the work or any other object. The tool is thus made to approach the work at a suitably regulated speed and in a safe manner by a yieldable actuating force.

The means for tilting lever 43 to effect cutting feed of the tool comprises, preferably, a threadedly connected nut and spindle device interposed between the rear ends of the supporting bar 39 and lever 43. This threaded spindle 84 is formed at its lower end with a thrust bearing flange 85 below which the spindle terminates in a reduced bearing portion 86. These parts are seated in correspondingly formed bearings in the upper end 87 of a yoke, indicated generally at 88, having spaced sides 89 closely but slidably embracing the sides of lever 43. Mounted between these sides of the yoke adjacent its lower end is a roller bearing element 90, the outer rotary cylinder of which engages the lower edge of the lever. An elliptical, take-up leaf spring 91 is inserted between the upper edge of the lever and the upper end of the yoke opening and retained therein by a pin 92 fixed in the yoke and extending through an opening in the spring, these parts being arranged to yieldably hold the roller bearing in engagement with the lower edge of the lever.

The upper end 87 of the yoke is provided with a detachable annular cover plate 93 surrounding the spindle and a roller thrust bearing 94 is held between the cover plate and the thrust flange 85 of the spindle. Substantially frictionless thrust bearings are thus provided between the spindle and yoke and between the yoke and the lever for transmitting to the lever the upward pull of the spindle 84 as it is rotated by means hereafter described to tilt the lever and effect cutting feed of the tool.

Spindle 84 extends upwardly through and in threaded engagement with a stationary nut 95 welded or otherwise fixed to the rear end of the upper supporting bar 39 (Fig. 2), above which the spindle is provided with a driving connection with the motor means 80. For this purpose, the spindle has cut therein a longitudinal keyway 96 (Fig. 20), having its side bearing surfaces cut below the root diameter of the spindle thread. A worm gear 97 has a central opening in which the spindle is loosely received, the gear being fixed to an outer ring 98 (Fig. 2) rotatably supported on a reduced end bearing 99 at the upper end of nut 95. The interior of the ring is stepped, as at 100, to provide horizontal and vertical bearing surfaces engaged with under and outer surfaces of the periphery of an annular bearing plate 101 fixed on the upper end of nut 95, in supporting engagement with the under face of gear 97 which is thus rotatably and detachably mounted on the upper end of the nut. Pivoted at 102 on the upper side of the gear is an arm 103 carrying a lug or key 104 adapted to slidably engage in the keyway 96 of the spindle, the arm and the key being further supported on the gear by a keeper strap 105 fixed to the gear and bridging the key. A coiled tension spring 106 is fixed to the free end of the arm and to the gear and normally holds the key in the keyway to fix the gear to the spindle. When desired, however, the arm may be moved against the tension of this spring to disengage the key from the keyway and free the spindle for rapid rotation in the nut 95 by means of the handwheel with which the upper end of the spindle is provided. A pin 106a depending from the arm may be releasably engaged in an opening 106b in the gear for temporarily holding the key out of the keyway in the spindle and thus freeing the spindle for such rotary adjustment.

The motor means for rotating gear 97 and spindle 84 to effect cutting feed of the tool comprises, preferably, the variable speed, reversible, rotary pneumatic motor 80 having a pair of ports for connection alternately with the source of air pressure and with a vent, for rotating the motor continously in one direction or the other, such rotary air motors being well known in the art and available commercially from various sources, so that a more detailed description thereof is unnecessary. Motor 80 is mounted on a base 107 (Fig. 3) fixed on a plate 108 which is fixed in turn on top of the supporting plate 39, as by means of an angle bracket 109. Fixed on the shaft 110 of the motor is a worm 111 meshing with the worm gear 97 for driving spindle 84. The outer end of the motor shaft is preferably provided with a supporting bearing in a post 112 on the opposite end of the motor supporting plate 108. One port of the motor has connected therewith the air hose 79 (Figs. 1 and 16) which has its other end connected with the motor port of outlet channel 65 of the cylinder and piston device for pivotally supporting the lever, while the other port of the motor has connected therewith an air hose 113 having its other end connected with valve means, which will now be described.

The valve means for controlling each of the above motor means preferably comprises a pair of cylindrical valve sleeves, of relatively small diameter, one nested within the other, the outer sleeve 114 (Figs. 7 and 15) having an open top and closed bottom and the inner sleeve 115 having a closed top and open bottom resting on and closed by the bottom of the outer sleeve. A cap 116, threadedly attached over the top of the outer sleeve, bears against the top of the inner sleeve and has therein a central opening 117 through which projects a boss 118 on the upper end of the inner sleeve 115. The inner sleeve is rotatable in closely fitting engagement with the interior of the outer sleeve and its top boss 117 has fixed thereto an actuating arm 120 which is rotated by the means hereafter described to rotate the inner sleeve to its different operating positions for registering the valve ports with which the sleeves are provided. The lower end of the outer sleeve is formed centrally with an inlet opening provided with a nipple 121 with which is connected an air hose 122 leading to a suitable source of air pressure. The lower open end of the inner sleeve thus communicates with the air inlet opening, so that operating air pressure is continuously supplied to the interior of the sleeve. The provision of closely fitted machined surfaces between the ends of the sleeves, and if necessary between their sides, is sufficient to prevent any excessive air leakage.

The valve ports are preferably arranged in sets in upper and lower planes, as shown, the upper set of the outer sleeve having a port opening 123 (Figs. 9, 11 and 13), provided with a nipple to which is connected the air hose 113 leading to one of the ports of motor 80. This set of the outer sleeve includes also an oppositely arranged port 124 venting to the atmosphere. In this same upper plane, inner sleeve 115 is formed with a pressure supply port 125 adapted to be registered with the port 123 leading to the motor (Fig. 13). In this plane also, the inner sleeve 115 is formed with diametrically arranged ports 126 and 127 connected by a cross tube 128 adapted, in a different position of the sleeve, to be registered at one end with port 123 and at the other end with the vent 124 in the outer sleeve, as shown in Fig. 11, for venting the motor through hose 113.

The valve sleeves are provided in the lower plane with a port 129 (Figs. 10, 12 and 14) in the outer sleeve having a nipple 130 with which is connected the hose 75 leading to the upper end of cylinder 63 of the cylinder and piston device for moving the pivotal mounting of the lever 43. The outer sleeve is also provided in this plane with a vent port 131. In this plane also the inner sleeve is formed with a port 132 adapted to be registered with outer port 129 for supplying air pressure through hose 75 to cylinder 63 of the lever mounting. It has also a pair of oppositely disposed ports 133 and 134 connected by a tube 135 adapted to be brought to position to connect hose 75 with vent opening 131 in the outer sleeve, to vent the top of cylinder 63 of the lever mounting.

It is apparent from this construction, as shown in Figs. 9 to 14, inclusive, that when valve arm 120 is moved to the inactive or starting position shown at the left in Figs. 9 and 10, the air supply and vent ports of the valve are all closed to correspond with the inactive position of the motor devices. When the valve arm is rotated to the opposite position for advancing the tool spindle, as shown at the right in Figs. 11 and 12, air pressure is supplied through port 132 of the inner sleeve (Fig. 12) to port 129 of the outer sleeve and to hose 75, for supplying air pressure to the top of cylinder 63 to first lower its piston to cause "approach" feed of the tool spindle, after which the air passes over the edge of the piston (Fig. 16) to the motor port 77 and through hose 79 to motor 80, to effect cutting feed of the tool spindle. At the same time the other port of motor 80 is vented through hose 113 and valve ports 123, 124, 126 and 127 of the outer and inner sleeves, respectively. In the intermediate position of the valve parts shown in Figs. 13 and 14, for retracting the tool spindle, air pressure is supplied through ports 125 and 123 to hose 113 (Fig. 13) and to the motor port for driving the motor in a reverse direction, at which time hose 75 leading to cylinder 63 is vented (Fig. 14) to allow the spring actuated lever 43 to rise and lift piston 63 to vent the other motor port through hose 79 to the atmospheric port 67 of the cylinder, as the tool spindle is rapidly backed-off or retracted from the work. It will be noted that spindle 84 is reversely rotated during this backing off movement, so as to reverse the cutting and further retract the tool, for a purpose hereafter described.

The means for operating the above described valve means, by moving its arm 120 from one to another of its three operating positions, comprises a mechanism supported by the shelf plate 40 on the upper supporting bar 39, as best shown in Figs. 4 to 8, inclusive. Plate 40 is formed with a slot 136 slidably receiving a pivot stud 137 depending from a bar 138 sliding on the upper surface of plate 40 and having its other end connected by a coiled tension spring 139 with a stationary part of the machine, such as a pin 140 in the forward end of the plate 40. Bar 138 has its opposite end adjacent its guide lug 137 connected by a coiled tension spring 141 with a pin 142 fixed in the outer end of valve arm 120 and extending above the edge of plate 40. The adjacent edge of plate 40 is indented to provide spaced stop shoulders 143 and 144 connected by an arcuate portion 145 concentric with the pivot of the valve arm.

These parts are so arranged, as shown, that the end of bar 138 slides across the pivot of valve arm 120 and when the bar is moved by its spring 139 to its left hand position, as shown in Fig. 4, its spring 141 swings the valve arm 120 with a snap-over action to position for disposing the valve parts as shown in Figs. 9 and 10, in which the motor devices are rendered inactive. Movement of bar 138 toward its right hand position shown in Fig. 5 serves to snap the valve arm over to position for arranging the valve parts as shown in Figs. 11 and 12, to effect approach and cutting feed of the tool spindle. Means are provided, as hereafter described, for releasably detaining valve lever 120 in the intermediate position shown in Fig. 6, in which the valve parts are arranged as shown in Figs. 13 and 14, for reversing the cutting feed and backing off the tool spindle.

The means for moving slide bar 138 against its spring to actuate the valve comprises, preferably, a latch slide 146 (Figs. 4 to 6, inclusive) slidably supported on the upper surface of shelf 40 and having a pair of depending guide pins 147 slidably received in a slot 148 in the plate, for confining the latch slide to linear movement through a short distance substantially parallel with bar 138. The latch is formed with a shoulder 149 arranged to engage a shoulder 150 on the bar 138 when the bar lies adjacent the latch slide, as shown in Figs. 4 and 5. The latch slide is moved toward the right from the position shown in Fig. 4 by means of a flexible push-pull wire 151 connected thereto at 152 and passing thence into a tubular holder 153 supported on the shelf and passing downwardly for connection of the wire with any suitable mechanical or manual actuating means, such as a common spring actuated foot treadle (Fig. 21), by which the wire may be pulled and pushed, as well understood in the art. By depressing the pivoted treadle lever 153a against the spring 154b, the wire is pulled to pull the slide and move bar 138 against the tension of its spring 139, from the position shown in Fig. 4 to the position shown in Fig. 5, and thus swing the arm 120 to operate the valve and advance the tool spindle, as described above. Means are provided for releasing bar 138 from the latch slide 141, which will now be described.

Pivoted at 154 on the upper surface of shelf 40 is a short lever 155, one end of which bears against the adjacent edge of bar 138, while its other end 156 is pivotally connected through an arcuate slot 157 in shelf 40 with the upwardly turned end 158 of a rod 159 disposed under and parallel with the shelf. Rod 159 has its other end pivotally connected at 160 with an arm 161 fixed on a vertical rod 162 having its ends mounted for rocking movement, respectively, in shelf 40 and in a bracket 163 extending rearwardly from the lower edge of supporting bar 39.

Fixed on rod 162 also is an arm 164 extending toward the threaded spindle 84 in position to be struck by a lug 165 projecting from a disk 166 having a central opening receiving and threadedly connected with spindle 84 (Figs. 2 and 18). On the upper surface of the disk 166 is a second disk 167, having a central opening rotatably received by a circular boss 168 projecting upwardly from disk 166, while the periphery of disk 167 is engaged beneath a plurality of clamping screws 169 adapted to be tightened by wing nuts 170 for clamping the disks together in adjusted relation. Disk 167 carries a releasable key for engagement with the keyway 96 of spindle 84, as described above in connection with the worm gear 97.

To this end, disk 167 is provided with a pin 171 on which is pivoted an arm 172 having projecting therefrom a lug 173 shaped as a key to engage in the keyway 96 of the spindle. The lever is guided by a keeper strap 174 bridging the key lug and the arm is normally moved to engage the key with the keyway by a coiled tension spring 175, fixed to the arm and to disk 167. The arm preferably carries a short pin projecting toward disk 167, for releasably engaging a hole 177 in the disk for holding the key out of the keyway and releasing disk 167 from the spindle. For rapid and coarse adjustment of the disks longitudinally of the spindle, they are unkeyed from it as just described, while for fine adjustments for precisely determining the depth of cut of the tool, disk 166 is released from its clamping screws 169 for rotary adjustment on the spindle to suitably position its lugs 165, after which the disks are again clamped together.

It is evident from this construction that with lug 165 suitably adjusted longitudinally and rotationally on the spindle 84 and fixed on it in such position, the lug rotates and rises with the spindle 84 during cutting feed of the tool spindle, until the desired depth of cut is reached, when lug 165 strikes lever 164, rocking the rod 162 to pull rod 159 and thus swing lever 155 from the position shown in Figs. 4 and 5 to substantially the position shown in Fig. 6. Such movement of lever 155 pushes slide bar 138 out of engagement with the latch slide 146, thereby releasing the slide bar for movement by its spring to its left hand position shown in Fig. 6, during which movement its spring 141 snaps valve arm 120 to an intermediate position in which it is releasably detained, as hereafter described. After lever 155 thus releases bar 138 and moves past center, its movement is continued by the pressure of the bar sufficiently to swing its actuating arm 164 out of the path of movement of the micrometer lug 165, to avoid interference between the two during the return of the lug to a lower position. Means are provided, as hereafter described, for restoring arm 164 to active position after lug 165 has moved downwardly to a lower position.

The means for detaining valve arm 120 in intermediate position for reversing the cutting feed and backing-off the spindle comprises, preferably, a spring latch strip 178 (Fig. 8) pivoted at its central portion within a stirrup or keeper loop 179 depending from shelf 40. The free end of the latch strip is formed with a hook 180 for latching engagement over the edge of valve arm 120. The other end of the latch strip embraces and is pivotally pinned, as at 181, to a limit stop rod 182 adjacent the under side of plate 40. The stop rod slides longitudinally in openings in plate 40 and in bracket 163, between which bearings the rod is encircled by a compression spring 183 tending to raise the rod until the associated end of the latch strip 178 strikes the under side of shelf 40, as shown in Fig. 8. The latch strip is slightly bent, as shown, so that in this position it is rocked on its keeper 179 to lower its hook 180 into the path of movement of the valve arm, to engage and detain it in intermediate position. Stop rod 182 extends downwardly in parallel spaced relation with threaded spindle 84 and has a threaded lower end carrying a pair of adjustable nuts 184 which lock each other in adjusted position.

An arm 185 (Fig. 1), bolted or otherwise fixed to yoke 87, extends adjacent to or slidably embraces rod 182, so that when the yoke reaches its lower position and the tool spindle has been fully backed-off, arm 185, striking the upper nut 184, lowers rod 182 against the tension of its spring 183, thereby pivoting latch strip 178 to the dotted line position shown in Fig. 8 in which it releases valve arm 120. The valve arm is then snapped over by spring 141 to the inactive position shown in Fig. 4, the spring having been tensioned by previous release and movement of bar 138 to the left hand position shown in Fig. 6, so that the parts are conditioned for repetition of the approach and cutting feed movements. During return of the valve arm to starting position, a pin 186 on the arm (Fig. 6) strikes a lug 187 on rod 159 and moves the rod to swing lever 155 to starting position (Fig. 4), aided by the pressure of bar 138, which is thus released for reengagement with the latch slide 146.

It will be noted that when the means for actuating the mechanism has been automatically disconnected, to reverse and retract the spindle, such actuating means remains disconnected until after withdrawal of the tool spindle and must then be again operated, thus safeguarding the mechanism by requiring a new operation of the actuating means in order to start a new feeding operation of the tool spindle.

To set up the mechanism for a particular job, the position of the pivotal mounting for lever 43 is adjusted longitudinally thereof and of the supporting bar 39, to afford the desired amplitude of movement for the tool spindle, the rate of feed and degree of accuracy in the work. For a more limited range of movement, slow feed and high accuracy, the mounting is adjusted toward the tool spindle, and vice versa. The key of worm gear 97 is disconnected from spindle 84 to free the spindle for manual operation. The treadle is actuated to pull wire 151 to produce an approach movement of the tool spindle and the point at which such movement stops and the cutting feed begins is set by adjusting either the turnbuckle sleeve 70 of the pivot mounting (Fig. 2), or by adjusting the stop nuts 184 on rod 182 (Fig. 1). The tool is then adjusted to the desired depth of cut by turning spindle 84 by hand and the foot pedal may then be released. The clamping screws 169 of the automatic reversing lug are loosened and the stop lug is screwed upwardly on the spindle until it first engages its cooperating arm 164, after which the disks 166 and 167 are again clamped together and the key of the worm gear is again reengaged with the spindle. The force and speed of the approach feed is regulated by adjusting the valve of the by-pass 82a, and the speed of the cutting feed is determined by throttling adjustment of the valve provided in the hose 79 leading to motor 80. The unit is then ready for operation and for finer adjustment of the micrometer depth stop, as required.

The operation of the machine has been described above in connection with the description of its construction. When the actuating means, such as a treadle, is depressed to pull on the push-pull wire 151, slide bar 138 is moved to snap the valve control means to position to advance the spindle. The pivot of lever 43 is first lowered by the cylinder and piston device to cause a rapid approach of the tool to the work, and if the tool inadvertently strikes an object during such movement, air flows through the by-pass line and the tool stops easily. When the tool reaches the end of its approach movement, the piston in the pivot mounting is held down by the full air line pressure which is then transmitted to the motor 80 to effect cutting feed. It will be noted that this feed is transmitted through threadedly connected, nut and spindle parts which apply a positive, uniform and non-oscillating force, free from the vibration and chatter characteristic of fluid piston drives and that this force can be readily varied by throttling the air pressure supplied to the motor.

To relieve the tool at any time during a cutting feed, the treadle is allowed to rise, thereby operating the control means to reverse the cutting feed and vent the pivot cylinder and produce rapid backing off movement of the tool. On again depressing the treadle, air is supplied to the pivot cylinder which repeats the approach feed in a rapid and safe manner. The resumption of the cutting feed begins after such approach and slightly before the tool again reaches the point at which relief was started, since the motor 80 rotates in reverse during the backing-off movement and is stopped during the approach, thereby preventing shock to the tool as it resumes cutting action. This relieving step may be repeated as often as desired and when the tool reaches the set depth, the micrometer reversing stop disengages the treadle and reverses the feed. When spindle 84 has been rotated down to starting position, its arm 185 strikes the limit stop nuts 184, to operate the valve means, close all ports, and discontinue the feeding movements, ready for release of the treadle to move latch slide 146 for reengagement with the slide bar 138, and for a further depression of the treadle to repeat the cycle.

The invention provides a feed mechanism requiring only regular factory compressed air for its operation. It is readily adapted for mounting on any drill press or the like, direct or belt driven, being sufficiently narrow for insertion between the adjacent tool heads of a multi-spindle press. Complete control is afforded by a simple, flexibly connected treadle, with a safe approach to the work which can be harmlessly stopped by inadvertent engagement with an interfering object. Such control feeds the tool with fast approach and backing-off movements and the tool can be relieved by releasing and redepressing the treadle, to effect rapid backing-off and reapproach to a point just above the bottom of the cut previously made. On reaching full depth, the feed of the tool is automatically reversed by a precisely adjustable micrometer reversing device, and the treadle or other actuating means is then disconnected until the withdrawal of the tool is completed. The amplitude and speed of the feeding movement can be readily and widely adjusted to suit operating conditions by adjustment of the pivot mounting of the member which operates the tool spindle, as well as by varying the speed of the motor device which produces the cutting feed, these various advantageous features being furnished in a mechanism capable of being set up for work in a simple and rapid manner. The component parts of the mechanism, furthermore, are relatively simple in construction and adapted to be readily and economically manufactured and assembled. And while the invention has been herein disclosed in a form adapted to be readily attached to existing machines, it is obviously capable of being originally supplied therewith as standard equipment.

It will thus be seen that the invention accomplishes its objects and while it has been herein disclosed by reference to the details of a preferred embodiment, it is to be understood that such disclosure is intended in an illustrative rather than a limiting sense, as it is contemplated that various modifications in the construction and arrangement of the parts will readily occur to those skilled in the art, within the spirit of the invention and the scope of the appended claims.

I claim:

1. A mechanism for feeding a rotary machine tool spindle comprising a lever provided with means for connection with said spindle, adjustable means for variably pivoting said lever on said machine to vary the amplitude of movement of the ends thereof, a pneumatic rotary motor provided with means for moving said lever to effect cutting movement of said spindle, a pneumatic piston and cylinder device for moving said lever to effect rapid approach and back-off movements of said spindle, and a pneumatic control system for operating said motor and device, in timed coordination with each other, to effect feeding movements of said spindle.

2. A machine for feeding a rotary machine tool spindle comprising a member provided at one end with means for connection with said spindle, means for pivoting said member intermediate its ends on said machine, cooperating parts having screw threaded connection with each other and provided with means for connection with said machine and with the other end of said member, respectively, pneumatic rotary means for rotating one of said parts to move said member and effect cutting movement of said spindle, a pneumatic piston and cylinder device for moving said member to effect rapid approach and back-off movements of said spindle, and a pneumatic control system for operating said motor means and device, in timed coordination with each other, to effect feeding movements of said spindle.

3. A mechanism for feeding a rotary machine tool spindle comprising a member provided at one end with means for connection with said spindle, means for pivotally mounting said member intermediate its ends on said machine, cooperating parts having a screw threaded connection with each other and provided with means for connection with said machine and with the other end of said member, respectively, pneumatic rotary motor means for rotating one of said parts to move said member and effect cutting movement of said spindle, a pneumatic piston and cylinder device for moving said mounting means of said member to effect rapid approach and back-off movements of said spindle, and a pneumatic control system for operating said motor means and device, in timed coordination with each other, to effect feeding movements of said spindle.

4. A mechanism for feeding a rotary machine tool spindle comprising a mounting having means for movably supporting the same on said machine, a lever pivoted intermediate its ends on said mounting and provided at one end with means for connection with said spindle, said mounting being movable on said machine relatively to and longitudinally of said lever to vary the amplitude of movement of said lever means, cooperating parts having a screw threaded connection with each other and provided with means for connection with said machine and with the other end of said lever, respectively, for pivotally tilting the same, and pneumatic rotary motor means for rotating one of said parts to move said member and effect cutting movement of said spindle.

5. A mechanism for feeding a rotary machine tool spindle comprising a mounting having means for movably supporting the same on said machine and provided with relatively movable cylinder and piston elements, a lever pivotally connected intermediate the ends thereof with the movable one of said elements for movement thereby, said lever being provided at one end with means for connection with said spindle, said mounting being movable on said supporting means in a direction extending longitudinally of said lever to vary the amplitude of movement of said lever ends, cooperating parts having a screw threaded connection with each other and provided with means for connection with said machine and with the other end of said lever, respectively, a pneumatic rotary motor for rotating one of said parts for tilting said lever to effect cutting movement of said spindle, and a pneumatic control system for operating said motor and said cylinder and piston parts, in timed coordination with each other, to effect feeding movements of said spindle.

6. A mechanism for feeding a rotary machine tool spindle comprising a mounting having means for supporting the same on said machine, a lever pivoted intermediate its ends on said mounting and provided at one end with means for connection with said spindle, a pneumatic motor having a connection with the other end of said lever for tilting the same to effect cutting movement of said spindle, said mounting having relatively movable cylinder and piston elements one of which is connected with said lever intermediate the ends thereof, said cylinder element having at one end thereof a port leading to atmosphere and a port connected with said motor, said ports being normally in communication with each other and said piston element being adapted on movement to said end of said cylinder element to close said atmosphere port and connect said motor port with the other end of said cylinder element, and a pneumatic control system for supplying air under pressure to said motor and to the other end of said cylinder element and for operating said motor and said cylinder and piston elements, in timed coordination with each other, to effect feeding movements of said spindle.

7. A feed mechanism for feeding the rotary spindle of a drill press or the like comprising a member provided with means for connection with said spindle, a substantially pivotal mounting for supporting said member on said machine for rocking movement in opposite directions, a piston and cylinder device supporting said mounting for movement to move said member to effect rapid approach and back-off movements of said spindle, a reversible pneumatic motor having means for rocking said member, a valve means for connection with a source of air pressure for operating said device, and valve means actuated by said device for controlling said motor means to effect said rocking movement of said member.

8. A feed mechanism for the rotary spindle of a drill press or the like comprising a lever provided at one end with means for connection with said spindle, a mounting for pivotally supporting said lever intermediate its ends on said machine, threadedly connected nut and spindle parts having means for connection with said machine and the other end of said lever, respectively, motor means for rotating one of said parts in opposite directions to pivot said lever and advance and retract said spindle to effect cutting feed thereof, auxiliary motor means for moving said mounting to effect rapid advance and back-off movements of said spindle, control means for operating said motor means, spring means for moving said control means in one direction to retract said spindle, actuating means having a releasable connection with said control means for moving said control means in the opposite direction against the force of said spring to advance said spindle, and trip means having a part movable in coordinated relation with said spindle and operating in a predetermined position thereof to automatically disconnect said actuating means and release said control means for movement by said spring means to position for retracting said spindle.

9. A feed mechanism for feeding the rotary spindle of a drill press or the like comprising a lever provided with means for connection with said spindle, a mounting for supporting said lever intermediate its ends for substantially pivotal rocking movement on said machine, motor means for moving said lever to effect cutting feed of said spindle, a piston and cylinder motor device for yieldably moving said mounting and lever to effect approach and back-off movements of said spindle, control means for operating said motor means and device in timed coordination with each other, actuating means, and a push-pull element connecting said control means and manual actuating means for effecting said feeding movements of said spindle.

10. A mechanism for feeding a rotary machine tool spindle comprising a lever provided with means for connection with said spindle, power operated motor means having a substantially pivotal connection with one portion of said lever for moving the same to effect a cutting feed of said spindle, a piston and cylinder device having a substantially pivotal connection with another portion of said lever for moving the same yieldably to effect rapid approach and back-off movements of said spindle, means for supporting said motor means and device on said machine, a source of fluid pressure, the cylinder of said device having conducting means leading to said pressure source and to the atmosphere, valve means controlling said conducting means to operate said device and effect said movements of said lever and means for actuating said valve means and controlling said motor means in predetermined coordination.

11. A mechanism for feeding a rotary machine tool spindle comprising a lever provided with means for connection with said spindle, power operated motor means having a substantially pivotal connection with one portion of said lever for moving the same to effect a cutting feed of said spindle, a piston and cylinder device having a substantially pivotal connection with another portion of said lever for moving the same yieldably to effect rapid approach and back-off movement of said spindle, means for supporting said motor means on said machine, means adjustably supporting said device for movement on said machine and longitudinally of said lever, to vary the amplitude of movement imparted thereby to said lever, a source of fluid pressure, conducting means connecting said pressure source with said device, valve means controlling said conducting means to effect said movements of said lever, and means for actuating said valve means and controlling said motor means in predetermined coordination.

12. A mechanism for feeding a rotary machine tool spindle comprising a lever provided with means for connection with said spindle, power operated motor means having a substantially pivotal connection with one portion of said lever for moving the same to effect a cutting feed of said spindle, a piston and cylinder device having a substantially pivotal connection with another portion of said lever for moving the same yieldably to effect rapid approach and back-off movements of said spindle, means for supporting said motor means and device on said machine, a source of fluid pressure, said device having conducting means leading to said pressure source and to the atmosphere, valve means controlling said conducting means to operate said device and effect said movements of said lever, a control system having means movable in one direction to advance said spindle and in another direction to retract said spindle, and manually operable means for moving said control system means in either of said directions.

EDWARD H. CUMPSTON, Jr.

REFERENCES CITED

The following references are of record in the file of this patent:

UNITED STATES PATENTS

| Number | Name | Date |
|---|---|---|
| 706,688 | Reynders et al. | Aug. 12, 1902 |
| 842,227 | Morse | Jan. 29, 1907 |
| 926,959 | Oney | July 6, 1909 |
| 1,401,388 | Balcker | Dec. 27, 1921 |
| 1,421,928 | Fitzgerald | July 4, 1922 |
| 1,838,459 | Smith et al. | Dec. 29, 1931 |
| 2,286,457 | Boillat | June 6, 1942 |